No. 864,166. PATENTED AUG. 27, 1907.
A. T. HERRICK.
PIPE COUPLING JACK.
APPLICATION FILED OCT. 27, 1906.
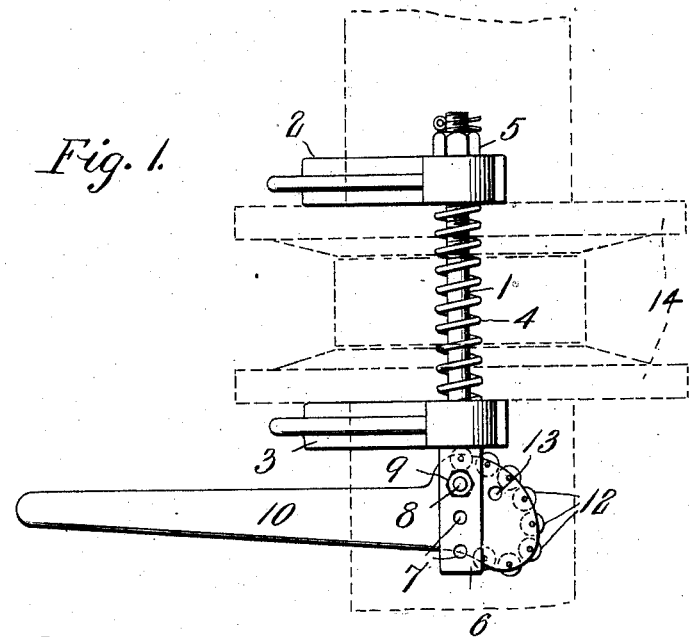
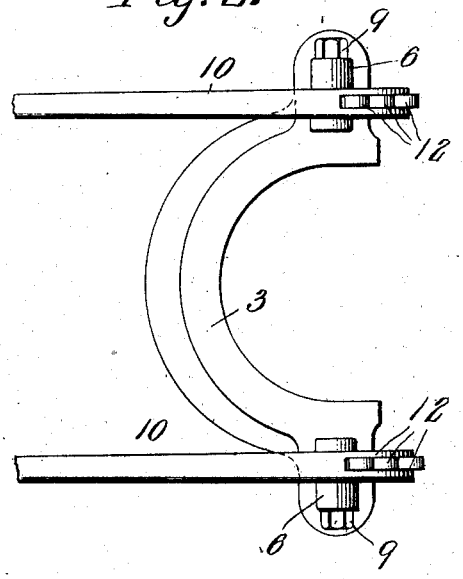
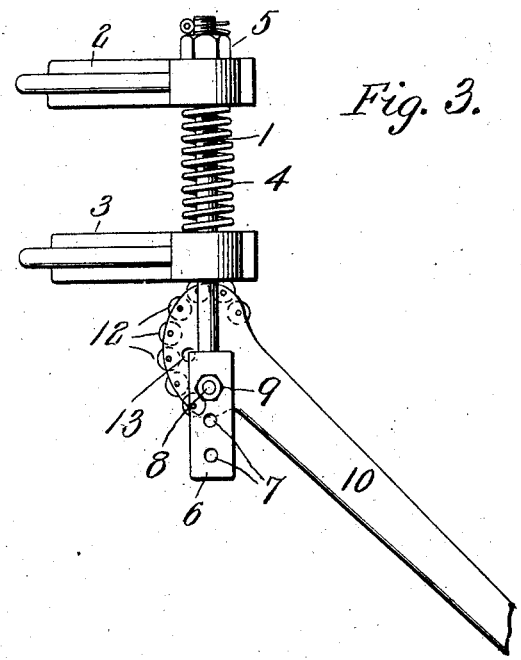
Witnesses
Jos. F. Collins
J. H. Simms
Inventor
Austin T. Herrick
By Knight Bros
Attorneys

UNITED STATES PATENT OFFICE.

AUSTIN T. HERRICK, OF BRADFORD, PENNSYLVANIA.

PIPE-COUPLING JACK.

No. 864,166.  Specification of Letters Patent.  Patented Aug. 27, 1907.

Application filed October 27, 1906. Serial No. 340,879.

*To all whom it may concern:*

Be it known that I, AUSTIN T. HERRICK, a citizen of the United States, and a resident of Bradford, in the county of McKean and State of Pennsylvania, have invented certain new and useful Improvements in Pipe-Coupling Jacks, of which the following is a specification.

This invention relates to pipe coupling jacks.

In the securing of pipe couplings of that type in which the joint between the sections is closed by packing, the desideratum is to confine the packing under great pressure. Heretofore, it has been impossible in many instances to secure as great a pressure as was necessary.

An object of the present invention is to provide means by which any desired pressure may be secured.

Other and further objects will appear in the following description and will be more particularly pointed out in the appended claims.

In the drawings: Figure 1 is a side view of one embodiment of my invention, the coupling being shown in dotted lines. Fig. 2 is a like view showing its position when placing the packing under pressure; and Fig. 3 is an end view.

Referring more particularly to the drawings, 1 indicates a pair of guide rods which are connected by a pair of segmental jaws 2 and 3 arranged in parallel planes, the ends of the jaws being perforated and having the rods passing therethrough. The jaws are separated by helical springs 4, each of which surrounds one of the rods and bears at its ends against the jaws. One of the jaws, namely 2, abuts nuts 5 which have screw threaded connection with the rods and permit the jaws and the springs to be removed from the rods.

Those ends of the rods opposite the nuts are each provided with transverse openings 7 through any one of which may pass one of two pivot bolts 8 which are secured in place by nuts 9. Each pivot bolt has journaled thereon, one of two levers 10, one end of each of which is provided with an eccentric cam head adapted to be thrown into engagement with the adjacent end of the jaw 3 and force said jaw toward the other jaw 2 in a direction at right angles to the planes of the jaws. The periphery of each cam head is provided with a plurality of anti-friction rolls 12. The leverage of each cam lever is adapted to be varied by placing its bolt 8 in a different one of the transverse openings 7, or by passing the bolt through another one of the openings 13 in the cam lever.

The device is used as follows: The jaws are placed on opposite sides of two collars or other abutments 14 and the levers 10 are adjusted so as to get the proper leverage. When the levers are moved in one direction, the cam heads bear against the movable jaw 3 and the collars are subjected to any desired pressure between the jaws. The usual bolts or other fastening devices are then fitted to the collars to maintain the latter in the desired positions. When the levers 10 are moved in the reverse direction, the springs act to move the bar 3 to its original position on rods 1.

Having thus described my invention, what I claim and desire to secure by Letters Patent is:

1. In a pipe coupling jack, the combination of a pair of segmental jaws arranged in parallel planes and means for moving said jaws toward each other in a direction at right angles to the planes of the jaws.

2. In a pipe coupling jack, the combination of a pair of segmental jaws arranged in parallel planes, rods connecting the jaws and on which one of the jaws is slidably arranged, and means engaging the sliding jaw and forcing it toward the other jaw at right angles to the planes of the jaws.

3. In a pipe coupling jack, the combination of a pair of segmental jaws arranged in parallel planes, rods connecting the jaws and on which one of the jaws is slidably arranged, and cam levers pivoted to the rods and adapted to engage the sliding jaw to force the same toward the other jaw in a direction at right angles to the planes of the jaws.

4. In a pipe coupling jack, the combination of a pair of segmental jaws arranged in parallel planes, rods connecting the jaws and on which one of the jaws is slidably arranged, cam levers pivoted to the rods and adapted to engage the sliding jaw to force the same toward the other jaw in a direction parallel to the planes of the jaws, and means for shifting the fulcrums of the levers.

5. In a pipe coupling jack, the combination of a pair of segmental jaws arranged in parallel planes, rods connecting the jaws and on which one of the jaws is slidably arranged, means engaging the sliding jaw and forcing it toward the other jaw in a direction at right angles to the planes of the jaws, and helical springs surrounding the rods between the jaws.

The foregoing specification signed at Bradford Pennsylvania this 15th day of October, 1906.

AUSTIN T. HERRICK.

In presence of two witnesses—
 MYERS TITUS,
 JAMES W. COIT.